3,258,451
POLYMERIZATION OF ACROLEIN
Karl-Heinz Rink and Erich Bäder, Hanau (Main), Germany, assignors to Deutsche Gold- und Silber-Scheideanstalt, Frankfurt am Main, Germany
No Drawing. Filed Dec. 9, 1964, Ser. No. 417,201
Claims priority, application Germany, Dec. 12, 1963, D 43,157
6 Claims. (Cl. 260—67)

The present invention relates to an improved process for the homo- or copolymerization of acrolein or α alkyl substituted acroleins wherein quantitative conversion of the acrolein or substituted acrolein is attained.

Polymerizations of acrolein, as is known, can be carried out as a spontaneous polymerization or under the influence of light, irradiation or catalysts to obtain high molecular weight products. A disadvantage of these procedures is that either the quantitative conversion of the monomeric acrolein to polyacrolein cannot be achieved or requires an extraordinarily long time. As a consequence, the polymerization mixture is processed after a certain conversion has been achieved, usually about 50 to 90%, to remove the unconverted monomeric acrolein from the polymeric product. The time required for such polymerization can stretch even to several weeks. Only very few types of acrolein polymerization, such as, for example, in the presence of basic catalysts in not too dilute a reaction medium, lead to quantitative ending of the polymerization in a relatively short period of time. In such instance, however, only lower molecular weight products are produced.

It is an object of the present invention to effect the quantitative polymerization present in technically feasible periods of time to obtain commercially utilizable products.

According to the invention it was found that this object could be achieved if acrolein or its α alkyl substituted derivative, if desired in the presence of vinyl compounds as comonomers, is polymerized in a first stage under non-alkaline conditions in a known manner, such as by spontaneous polymerization or with the aid of light, irradiation or non-basic catalysts, and after 10 to 90% by weight of the monomeric acrolein or acrolein derivative has polymerized adding a basic catalyst to the polymerization mixture and finishing the polymerization in a second stage within a period of a few minutes to about one hour.

The second stage of the process according to the invention can be considered a residual polymerization as the unconverted monomer, therefore the remainder of the monomer which had not polymerized in the first stage carried out under non-alkaline conditions, is then polymerized with the basic catalyst.

The light which can be employed as initiator in the first stage can be light of various wave lengths. The polymerization can be initiated with ordinary light as well as with UV light. Instead of light, various known irradiation methods can be used, such as, for example, with γ-rays.

However, it is more advantageous to employ non-basic catalysts, such as, azo compounds, per-compounds, redox systems, metal and non-metal halides, phosphorus compounds, oxygen compounds of quadrivalent sulfur, as well as addition compounds of polymers and such oxygen compounds of quadrivalent sulfur.

The following, for example, are illustrative of catalysts or catalyst systems within the groups named: azoisobutyricacid dinitrile; organic peroxides or hydroperoxides, such as tertiary butyl peroxide, tetrahydronaphthalene hydroperoxide, cumene hydroperoxide, dicumyl peroxide, dibenzoyl peroxide, cyclohexanone peroxide, triacetone peroxide; inorganic peroxides, such as. hydrogen peroxide; persulfates, such as, potassium or ammonium persulfate; redox systems, such as, combinations of hydrogen peroxide or organic hydroperoxides with derivatives of nitrous acid or with polymer-addition compounds of oxygen compounds of quadrivalent sulfur; combinations of hydrogen peroxide or organic hydroperoxides or persulfates with heavy metal salts, with alkali metal salts of acids of sulfur in its lower valent stages; metal or non-metal halides, such as, aluminum chloride, titanium tetra-chloride, boron trifluoride—also in etherate form; phosphines, such as, triethyl phosphine; oxygen compounds of quadrivalent sulfur, such as, sulfur dioxide, sulfurous acid, alkali metal bisulfites inclusive of ammonium bisulfite; polymer-addition compounds of polyacrolein, of copolymers of acrolein with vinyl compounds, of gelatin, of cellulose polyether, of various polyvinyl compounds, of polyglycol, of polyguanidine with oxygen compounds, of quadrivalent sulfur, such as, sulfur dioxide, sulfurous acid, or alkali metal bisulfites inclusive of ammonium bisulfite.

As already indicated, the polymerization in the first stage is carried out in the absence of a basic catalyst until 10 to 90% by weight of the monomer has polymerized. Preferably, such first stage polymerization is continued until 50 to 80% by weight of the monomer has polymerized. Thereafter, the basic catalyst is added to the polymerization mixture.

Fundamentaly, all basic reacting substances, which are active anionically, come into question as the basic catalysts. Suitable basic catalysts, for example, are: aliphatic and aromatic, primary, secondary or tertiary mono-amines, such as, methyl-, ethyl-, propyl- or butyl amine, aniline, dimethyl aniline; cycloaliphatic amines, such as, cyclohexyl amine; heterocyclic amines, such as, piperidine, as well as, aliphatic and aromatic diamines, such as, trimethylene diamine, hexamethylene diamine, ethylene diamine, o-, m- or p-phenylene diamine and their methyl derivatives, also triamines, such as, diethylene triamine; hydrazine; hydroxyl amine; alkali metal-, ammonium-, alkaline earth metal-hydroxides, carbonates or alcoholates with methyl-, ethyl-, propyl- and butyl alcohols. Of the amines, piperidine and triethylamine of the hydroxides, sodium hydroxide and of the carbonates and alcoholates, potassium carbonate and sodium ethylate are particularly suited. The basic catalysts can be used singly or in combination. They can be added as such or in the form of their solutions in organic solvents or water. When added in the form of solutions they are added as 0.5–50% or preferably 1–10% by weight solutions.

In the process according to the invention it is possible to produce precipitation polyacroleins as well as emulsion polyacroleins. A polymer adduct with $SO_2$ and/or alkali metal bisulfite, especially, a polyacrolein-$SO_2$, is particularly suited as emulsifier both for the monomer and for the polymer in aqueous mediums.

If the polyacrolein at the end of the polymerization should be in the dissolved state an aqueous alkali metal hyroxide solution is used as the basic catalyst, in stoichiometric quantity with respect to the acrolein which was not polymerized in the first stage. The polyhydroxy polycarboxylic acids produced in this manner (in the form of their alkali metal salts) widen the possibilities of use of the polyacroleins obtained as they are strong polyelectrolytes.

The two stage process according to the invention is especially adapted for carrying out quantitative emulsion polymerizations.

The polymerization temperatures lie in the range of 10 to 100° C. preferably between 20 and 60° C.

As indicated above, the two stage polymerization according to the invention is not limited to the homopolymerization of acrolein but is also applicable to the homopolymerization of α alkyl substituted derivatives of acrolein especiallyl methacrolein. In addition, copolymers of acrolein or its α alkyl substitution products with vinyl compounds can also be obtained. In such copolymerizations, for example, the acrolein and the comonomers, such as, styrene, α-methyl styrene, methyl methacrylate, vinyl acetate, acrylonitrile, acrylamide, are prepolymerized in the first stage and then in the second stage the unpolymerized acrolein and in some instances the incompletely polymerized comonomer are then completely polymerized in the presence of a basic catalyst in the second stage. It furthermore is possible to have additional copolymerization catalysts for the comonomer present during the entire polymerization reaction.

The technical advantage of the two stage process according to the invention first of all resides in that it is possible to produce high molecular weight products of molecular weights up to one million in 1 to 20 hours, preferably, 3 to 8 hours, without the necessity of providing a separate procedure for the removal of the unconverted acrolein. The latter is particularly difficult and cumbersome in precipitation polymerizations as the polyacrolein upon washing with water is very difficult to filter or centrifuge and has a tendency to clog the separating apparatus in view of its tendency to hydrate formation. These difficulties are very restrictive on the introduction of such process for large scale commercial applications. In addition, the wash water which is contaminated with acrolein or α-alkyl substituted acrolein must be processed as it cannot be discharged as such into the usual sewage systems.

On the other hand, in emulsion polymerizations the monomeric acrolein or α-alkyl substituted acrolein is distilled off and the polyacrolein is damaged by the long exposure to heat in view of structural changes engendered thereby and as a consequence the reactivity is decreased.

Polyacrolein which has not been processed to remove residual monomeric acrolein or α-alkyl substituted acrolein cannot be used technically because of the unbearable monomer odor as well as the irritating effect of the monomers, particularly of acrolein, on the eyes. Polyacrolein contaminated with acrolein monomers is practically unusable.

A further advantage of the process according to the invention is molecular weight distribution which can be achieved in the product produced. Previously, polyacrolein products belonged to only one molecular weight distribution range. The new products not only have a definite molecular weight distribution range which is influenced by the initiator but also, in view of the two different types of polymerization, the range engendered by the polymerization initiator employed to start the polymerization and that engendered by the basic catalyst are superimposed. The relationship between these two ranges can be adjusted as desired, depending upon the point of time at which the basic catalyst is added. The earlier the basic catalyst is added the more pronounced the molecular weight distribution engendered by such basic catalyst becomes. As the range engendered by the basic catalyst always lies at molecular weights under 5000, the resultant products always possess the special properties of both molecular weight ranges and therefore the reactivities of both ranges are superimposed. The total reactivity of the products has become adjustable by the process according to the invention.

The following examples will serve to illustrate the process according to the invention with reference to several embodiments thereof. The proportions are given by weight unless specified otherwise.

Example 1

125 parts of water, 50 parts of acrolein and 4 parts of an aqueous polyacrolein-SO₂ adduct solution containing 15% of polyacrolein and 8% of SO₂ which acted simultaneously as polymerization catalyst and emulsifier were stirred for 5 hours at 20–25° C. without heating. At this point 50% of the acrolein had polymerized to emulsion polyacrolein of a molecular weight of 300,000. The remainder of the acrolein was then polymerized with the basic catalysts given in the table below. The polymerization of the remaining acrolein was complete within a few minutes after addition of the basic catalyst. The polymerization product was then practically odorless and could be used directly in this form for further technical reactions. The basic catalysts were added to the polymerization mixture at 20° C. and the course of the resulting exothermic reaction is indicated in the table.

| Quantity and type of catalyst | Temperature rise in number of minutes indicated | Total yield, percent |
| --- | --- | --- |
| 1 part 10% NaOH | To 50° in 2′ | 100 |
| 0.75 part 10% KOH | To 47° in 2′ | 100 |
| 2 parts 10% K₂CO₃ solution | To 43° in 7′ | 100 |
| 1 part 10% triethylamine solution in H₂O | To 47° in 4′ | 100 |
| 0.5 part 10% piperidine solution in H₂O | To 46° in 4′ | 100 |

Example 2

The first stage polymerization was carried out as in Example 1 except that it was continued for 8 hours rather than 5 before addition of the basic catalyst. In this time 60% of the acrolein had polymerized to a corresponding polyacrolein. The remaining 40% of acrolein were polymerized by the addition of the basic catalyst. The results are tabulated in the following table.

| Quantity and type of catalyst | Temperature rise in number of minutes indicated | Total yield, percent |
| --- | --- | --- |
| 0.8 part of 10% NaOH | To 45° in 5′ | 100 |
| 0.7 part 10% KOH | To 42° in 4′ | 100 |
| 1.8 parts 10% K₂CO₃ solution | To 40° in 6′ | 100 |
| 0.9 part 10% triethylamine solution in H₂O | To 40° in 6′ | 100 |
| 0.5 part 10% piperidine solution in H₂O | To 36° in 6′ | 100 |
| 1.3 parts 10% aqueous NH₃ | To 39° in 8′ | 100 |

Example 3

The first stage polymerization was carried out as in Example 1 for 8 hours and the polymerization mixture then permitted to stand at 20° C. for a further 8 hours. At this point 70% of the acrolein had undergone polymerization. The remaining 30% of acrolein were then polymerized by the addition of the basic catalyst.

The results are tabulated in the following table.

| Quantity and type of catalyst | Temperature rise in number of minutes indicated | Total yield, percent |
| --- | --- | --- |
| 0.8 part 10% NaOH | To 38° in 5′ | 100 |
| 0.7 part 10% KOH | To 37° in 4′ | 100 |
| 1.6 parts 10% K₂CO₃ solution | To 35° in 10′ | 100 |
| 0.9 part triethylamine solution in H₂O | To 35° in 10′ | 100 |
| 0.5 part 10% piperidine solution in H₂O | To 35° in 10′ | 100 |
| 1.4 parts 10% aqueous NH₃ | To 34° in 10′ | 100 |

When the polymerization mixture was allowed to stand longer at room temperature the yield of polyacrolein in the first stage polymerization could be increased still further. For example, upon standing for two weeks a 90% yield was attained. This mode of procedure is too cumbersome to the technically feasible and is economically unsound as even after permitting the mixture to stand for long periods it still contains residual monomeric acrolein which must be removed.

Example 4

45 parts of 100% aqueous NaOH were added to the first stage polymerization product of Example 3 in which 70% of the acrolein had been polymerized at 20° C. over a 2 minute period with stirring in order to effect polymerization of the remaining 30% of acrolein with a simultaneous Cannizzaro-disproportionation. The corresponding polyhydroxy polycarboxylic acid (as sodium salt) was formed via polyacrolein with slight yellow coloration of the entire reaction mixture. The emulsion form of the entire reaction mixture was retained.

*Example 5*

A mixture of 30 parts of acrolein, 150 parts of water and 1 part of $H_2O_2$ (35%) in which 0.5 part of iron II sulfate was dissolved was heated to 50° C. for 1 hour on a water bath while stirring. The reaction mixture containing the precipitation polyacrolein which was obtained in a 75% yield was cooled to 20° C. and then 2 parts of 30% aqueous hydrazine hydrate were added to such mixture to polymerize the remaining monomeric acrolein contained therein. Such remaining monomeric acrolein polymerized in 8 minutes with a rise in temperature.

*Example 6*

A mixture of 50 parts of acrolein and 50 parts of acrylonitrile was dispersed in a solution of 1 part of potassium persulfate in 200 parts of water while stirring and 2.5 parts of an aqueous solution containing 18% of polyacrolein and 10% of $SO_2$ were then added. The mixture was then heated while stirring for 2 hours at 60° C. The reaction mixture which contained the copolymer formed in about an 80% yield was cooled to 20° C. and 3 parts of an aqueous 40% solution of ethylene diamine added thereto. The polymerization was completed quantiatively within several minutes with a rise in temperature.

*Example 7*

50 parts of α-methylacrolein were mixed with stirring with a solution of 0.3 part of triethyl phosphine and 0.2 part of sec. butanol in 50 parts of n-heptane. The mixture was stirred for 2 hours and then diluted with 50 parts of n-heptane and the 40% of α-methylacrolein still remaining in the reaction mixture polymerized in 10 minutes by the addition of 5 parts of 10% aqueous NaOH.

We claim:

1. In a process for the polymerization of an acrolein monomer selected from the group consisting of acrolein and a lower alkyl substituted acrolein, the steps of initiating polymerization of the acrolein monomer under non-alkaline conditions in a first stage and after 10 to 90% of said acrolein monomer has undergone polymerization under the non-alkaline conditions adding a catalytically effective amount of a basic polymerization catalyst to the reaction mixture to polymerize the remaining acrolein monomer quantitatively in a second stage.

2. The process of claim 1 in which a redox system is used to initiate the polymerization in the first stage and sodium hydroxide is used as the basic catalyst in the second stage.

3. The process of claim 2 in which the quantity of sodium hydroxide employed is stoichiometric with respect to the remaining acrolein monomer.

4. The process of claim 1 in which an aqueous polyacrolein-$SO_2$ solution is used to initiate the polymerization in the first stage and sodium hydroxide is used as the basic catalyst in the second stage.

5. The process of claim 4 in which the quantity of sodium hydroxide employed is stoichiometric with respect to the remaining acrolein monomer.

6. The process of claim 1 in which the acrolein monomer is polymerized in the form of an aqueous emulsion.

References Cited by the Examiner

UNITED STATES PATENTS

| | | | |
|---|---|---|---|
| 2,657,192 | 10/1953 | Miller et al. | 260—67 |
| 2,819,252 | 1/1958 | Shokal | 260—67 |
| 3,068,203 | 12/1962 | Schweitzer | 260—67 |
| 3,069,389 | 12/1962 | Welch | 260—67 |

WILLIAM H. SHORT, *Primary Examiner.*

L. M. MILLER, *Assistant Examiner.*